US009185886B2

(12) United States Patent
Nelson et al.

(10) Patent No.: US 9,185,886 B2
(45) Date of Patent: Nov. 17, 2015

(54) LIVESTOCK ANIMAL SCALE PLATFORM

(71) Applicants: Chris Nelson, Harrisburg, SD (US); Garry Hager, Galesburg, IL (US)

(72) Inventors: Chris Nelson, Harrisburg, SD (US); Garry Hager, Galesburg, IL (US)

( * ) Notice: Subject to any disclaimer, the term of this patent is extended or adjusted under 35 U.S.C. 154(b) by 205 days.

(21) Appl. No.: 14/151,522

(22) Filed: Jan. 9, 2014

(65) Prior Publication Data
US 2014/0190422 A1    Jul. 10, 2014

Related U.S. Application Data

(60) Provisional application No. 61/750,857, filed on Jan. 10, 2013.

(51) Int. Cl.
*G01G 17/08* (2006.01)
*G01G 21/22* (2006.01)
*A01K 29/00* (2006.01)

(52) U.S. Cl.
CPC ............... *A01K 29/00* (2013.01); *G01G 17/08* (2013.01); *G01G 21/22* (2013.01)

(58) Field of Classification Search
CPC ....... G01G 17/08; G01G 21/22; G01G 21/28; A01K 29/00; A01K 29/005
See application file for complete search history.

(56) References Cited

U.S. PATENT DOCUMENTS

| | | | | |
|---|---|---|---|---|
| 1,047,725 A | * | 12/1912 | Worthington | G01G 17/08 119/511 |
| 3,679,011 A | * | 7/1972 | Hawver | G01G 3/08 177/134 |
| 3,935,913 A | * | 2/1976 | Wagner | G01G 21/22 177/134 |
| 4,280,576 A | * | 7/1981 | Smith, Jr. | G01G 19/02 177/126 |
| 7,339,123 B2 | * | 3/2008 | Yamashita | G01G 19/02 177/238 |

* cited by examiner

*Primary Examiner* — Randy W Gibson

(57) ABSTRACT

A livestock animal scale platform includes a panel that has a top side, a bottom side, a front edge, a rear edge, a first lateral edge and a second lateral edge. A plurality of lateral supports is mounted on the top side and extends from the first lateral edge to the second lateral edge. A plurality of longitudinal supports is mounted on the bottom side and extends from the front edge to the rear edge. A plurality of fasteners extends through the panel and each of the fasteners engages one of the lateral supports and one of the longitudinal supports. A barrier coating is positioned on and covers entirely the top side. The panel is placed upon one or more load cells to measure a weight of an animal standing on the panel.

8 Claims, 3 Drawing Sheets

LIVESTOCK ANIMAL SCALE PLATFORM

This application claims benefit of U.S. Provisional Application 61/750,857 under 35 U.S.C. Section 119(e) filed on Jan. 10, 2013.

BACKGROUND OF THE DISCLOSURE

Field of the Disclosure

The disclosure relates to scale platforms and more particularly pertains to a new scale platform for positioning within a livestock alley and supporting livestock on load cells while the livestock is being weighed.

SUMMARY OF THE DISCLOSURE

An embodiment of the disclosure meets the needs presented above by generally comprising a panel that has a top side, a bottom side, a front edge, a rear edge, a first lateral edge and a second lateral edge. The panel is comprised of a metallic material. A plurality of lateral supports is mounted on the top side and extends from the first lateral edge to the second lateral edge. The lateral supports are spaced from each other and are oriented parallel to each other. A plurality of longitudinal supports is mounted on the bottom side and extends from the front edge to the rear edge. The longitudinal supports are spaced from each other and are oriented parallel to each other. A plurality of fasteners extends through the panel. Each of the fasteners engages one of the lateral supports and one of the longitudinal supports such that each of the lateral supports is coupled to at least two of the longitudinal supports. A barrier coating is positioned on and covers entirely the top side. The barrier coating comprises an elastomeric coating. The panel is configured to be placed upon one or more load cells to measure a weight of an animal standing on the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
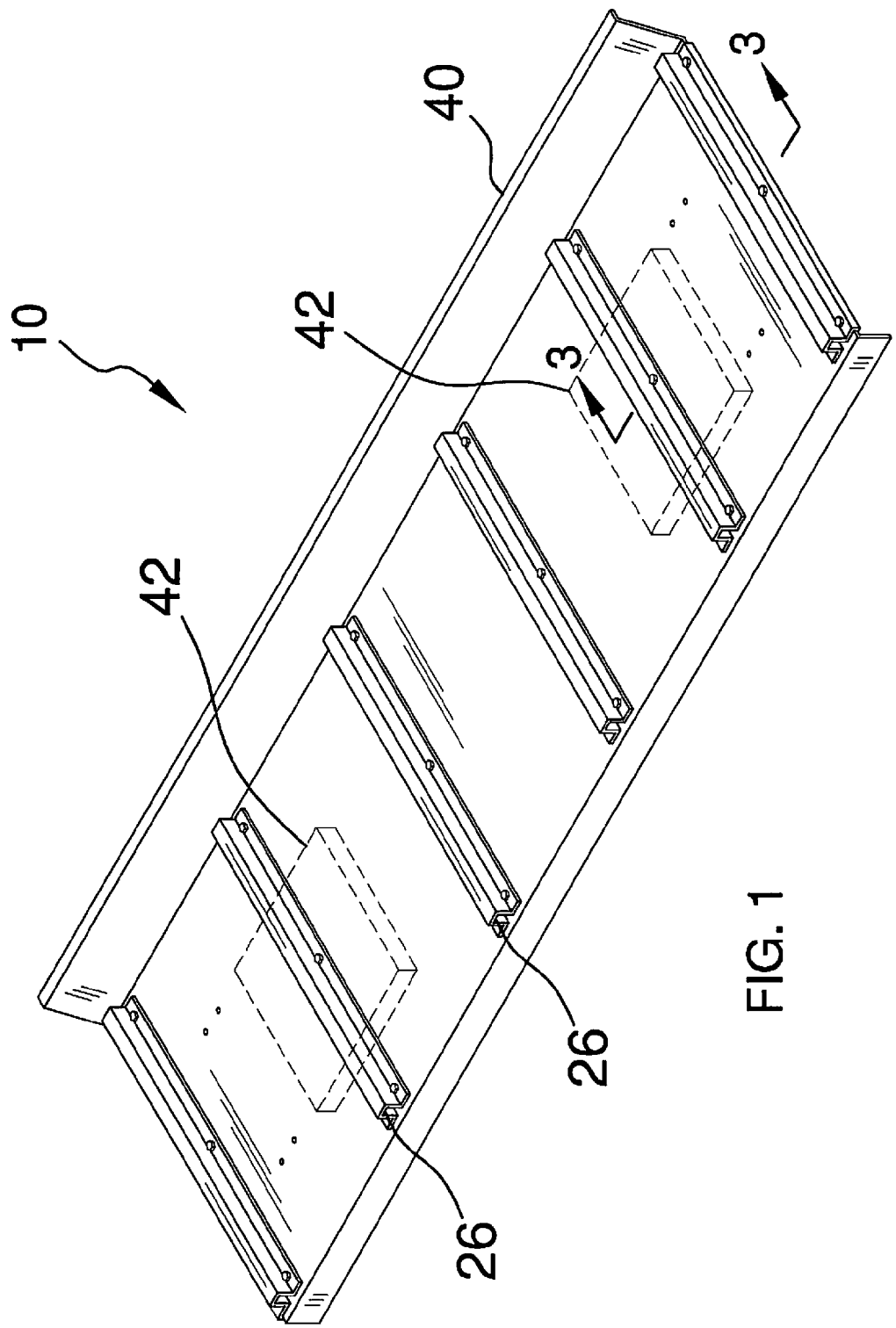
FIG. 1 is a top perspective view of a livestock animal scale platform according to an embodiment of the disclosure.
Figure 2:
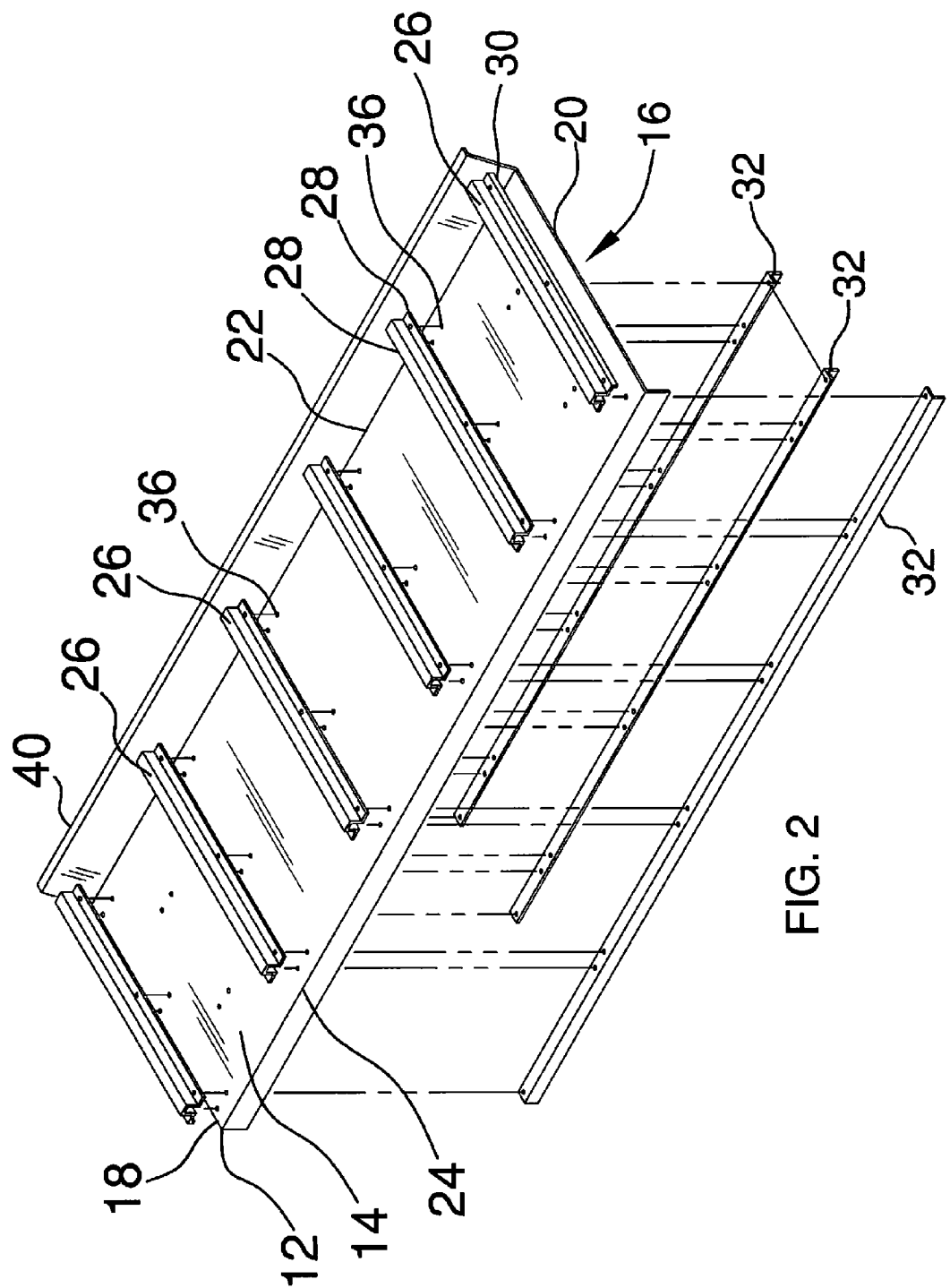
FIG. 2 is an exploded top perspective view of an embodiment of the disclosure.
Figure 3:
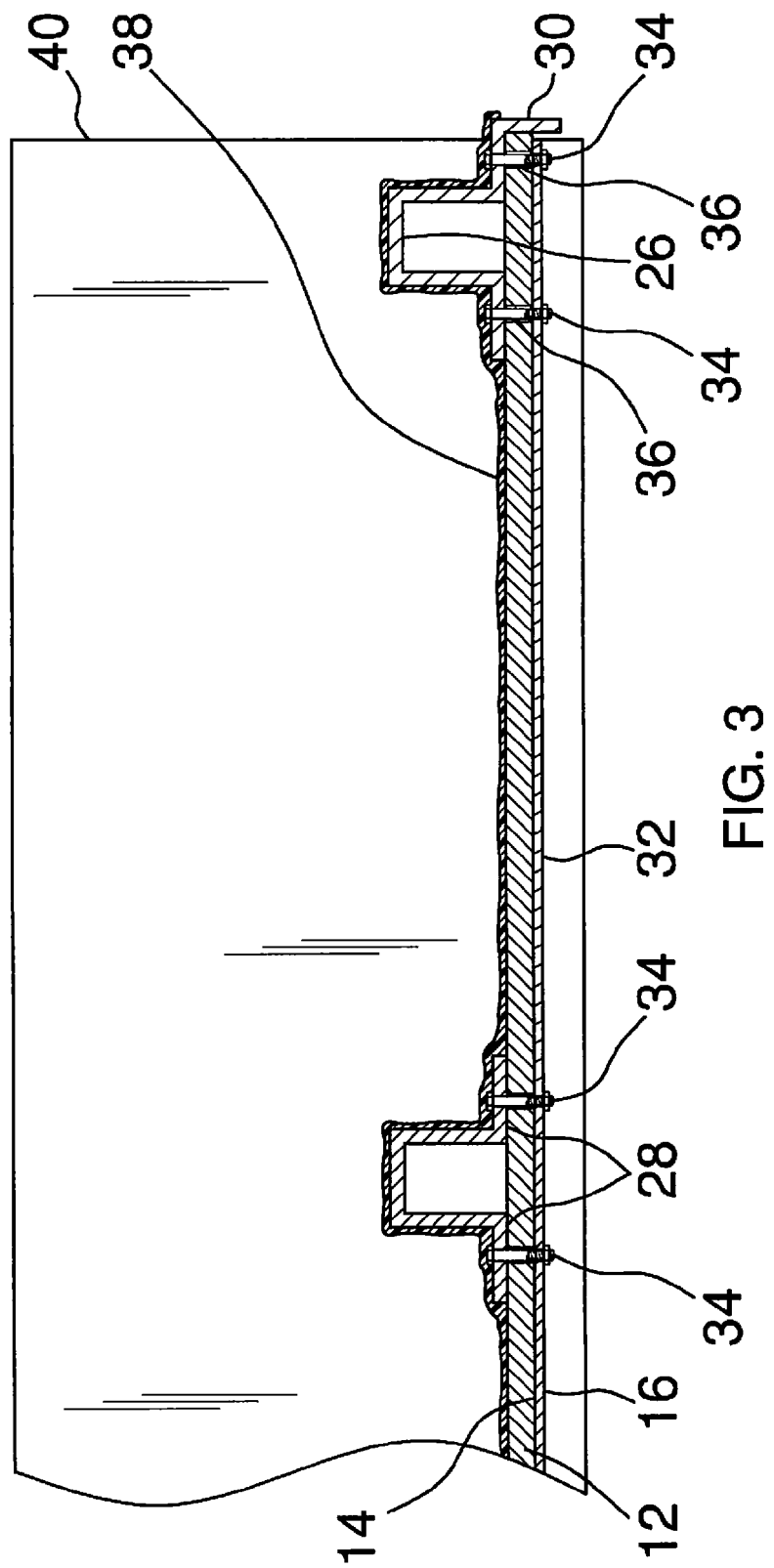
FIG. 3 is a cross-sectional view of an embodiment of the disclosure taken along line 3-3 of FIG. 1.

With reference now to the drawings, and in particular to FIGS. 1 through 3 thereof, a new scale platform embodying the principles and concepts of an embodiment of the disclosure and generally designated by the reference numeral 10 will be described.

As best illustrated in FIGS. 1 through 3, the livestock animal scale platform 10 generally comprises a panel 12 that has a top side 14, a bottom side 16, a front edge 18, a rear edge 20, a first lateral edge 22 and a second lateral edge 24. The panel 12 has a length from the front edge 18 to the rear edge 20 approximately between 5.0 feet and 9.0 feet. The panel 12 is comprised of a metallic material and more particularly may be comprised of a galvanized steel material.

A plurality of lateral supports 26 is mounted on the top side 14 and each extends from the first lateral edge 22 to the second lateral edge 24. The lateral supports 26 are equally spaced from each other and are oriented parallel to each other. The plurality of lateral supports 26 may include at least three lateral supports 26 and no more than ten lateral supports 26. The lateral supports 26 are typically spaced from each other a distance between 1.0 feet and 2.0 feet such that generally there are at least five lateral supports 26 and no more than seven lateral supports 26. The lateral supports 26 extend upwardly from the top side a distance of less than 2.0 inches. The lateral supports 26 may include flanges 28 for receiving fasteners 34 as stated below. Further, the lateral supports 26 positioned adjacent to the front 18 and rear 20 edges may include downwardly extending lips 30 to abut against the front 18 and rear 20 edges.

A plurality of longitudinal supports 32 is mounted on the bottom side 16 and each extends from the front edge 18 to the rear edge 20. The longitudinal supports 32 are equally spaced from each other and are oriented parallel to each other. The longitudinal supports 32 include at least two longitudinal supports and no more than five longitudinal supports. A plurality of fasteners 34 extends through the panel 12. Each of the fasteners 34 engages one of the lateral supports 26 and one of the longitudinal supports 32 such that each one of the lateral supports 26 is coupled to at least two of the longitudinal supports 32. As can be seen in the Figures, the lateral supports 26 may be coupled to each longitudinal support traversed. The fasteners 34 may comprise rivets which are extended through pre-drilled apertures 36 in the panel 12.

A barrier coating 38 is positioned on and covers entirely the top side 14. The barrier coating 38 may be positioned on the bottom side 16 and a perimeter edge of the panel 12. The barrier coating 38 may be applied after the apertures 36 have been drilled to cover the peripheral edges of the apertures 36. It should further be understood that the lateral 26 and longitudinal 32 supports may also be covered with the barrier coating 38. The barrier coating 38 may comprise an elastomeric coating such as a plastic or rubber material. More particularly, the barrier coating 38 may comprise a coating which is applied by a spraying technique with materials such as, for example, polyurea. The barrier coating 38 will prevent the degradation of the panel 12 from caustic substances typically carried on the hooves of livestock. Additionally, the material will increase the traction between the hooves and the panel 12 to prevent injury to the livestock.

A lateral barrier 40 is attached to the first lateral edge 22 and extends upwardly therefrom. The lateral barrier 40 is coextensive with the first lateral edge 22. The lateral barrier 40 is angled away from the panel such that an obtuse angle is formed with the lateral battier 40 and the top side 14. Typically an alley is formed before a head gate assembly used for engaging the head of a livestock. The alley, as conventionally known in the art, is used to direct cattle where desired by forming corridors through which only one animal at a time walks through. While an animal is within the alley awaiting its turn to be placed in the head gate, the animal may be weighed on a scale positioned within the alley. However, the alley width is adjusted to ensure that only one animal is comfortably positioned on the scale at one time. For this reason, the alley will include an adjustable side wall that moves over the panel 12 from the second lateral edge 24 toward the first lateral edge 22. Because this side wall is positioned over the panel 12, an animal cannot easily slip a leg under the side wall and over the second lateral edge 24. The lateral barrier, which is positioned adjacent to an opposite and fixed wall of the alley, prevents the animal from slipping over the first lateral edge 22 and outwardly of the alley.

In use, the panel 12 is configured to be placed upon one or more load cells 42 to measure a weight of an animal standing on the panel 12. The panel 12 will be positioned within the alley of a cattle or other livestock directing/handling assembly and more specifically may be used with cattle before the cattle is placed in a cattle head gate. Typically the scale is therefore placed before the head gate housing. At this position, only one animal will be able to step upon the panel 12. The load cells 42 are typically coupled to an electronic readout positioned on one of the side walls of the alley to facilitate the reading thereof. The lateral 26 and longitudinal 32 supports add rigidity to the panel 12 to prevent its deformation while the lateral supports 26 further provide additional traction for the animal. The barrier coating 38 prevents corrosion to the panel 12 which in turn allows for the usage of metals other than typically used aluminum which is very costly. The barrier coating 38 may be roughened to provide additional traction for the animal.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A scale platform assembly for positioning within a livestock alley, said assembly including:
   a panel having a top side, a bottom side, a front edge, a rear edge, a first lateral edge and a second lateral edge, said panel being comprised of a metallic material;
   a plurality of lateral supports being mounted on said top side and extending from said first lateral edge to said second lateral edge, said lateral supports being spaced from each other and being oriented parallel to each other;
   a plurality of longitudinal supports being mounted on said bottom side and extending from said front edge to said rear edge, said longitudinal supports being spaced from each other and being oriented parallel to each other;
   a plurality of fasteners extending through said panel, each of said fasteners engaging one of said lateral supports and one of said longitudinal supports such that each of said lateral supports is coupled to at least two of said longitudinal supports;
   a barrier coating being positioned on and covering entirely said top side, said barrier coating comprising an elastomeric coating; and
   wherein said panel is configured to be placed upon one or more load cells to measure a weight of an animal standing on said panel.

2. The scale platform assembly according to claim 1, wherein said panel has a length from said front edge to said rear edge between 5.0 feet and 9.0 feet.

3. The scale platform assembly according to claim 1, wherein said plurality of lateral supports includes at least three lateral supports and no more than ten lateral supports.

4. The scale platform assembly according to claim 3, wherein said longitudinal supports includes at least two longitudinal supports and no more than five longitudinal supports.

5. The scale platform assembly according to claim 1, further including a lateral barrier being attached to said first lateral edge and extending upwardly therefrom, said lateral barrier being coextensive with said first lateral edge, said lateral barrier being angled away from said panel such that an obtuse angle is formed with said lateral battier and said top side.

6. The scale platform assembly according to claim 1, wherein said barrier coating being roughened for increasing traction on said barrier coating.

7. The scale platform assembly according to claim 1, wherein said barrier coating comprises polyurea.

8. A scale platform assembly for positioning within a cattle alley, said assembly including:
   a panel having a top side, a bottom side, a front edge, a rear edge, a first lateral edge and a second lateral edge, said panel having a length from said front edge to said rear edge between 5.0 feet and 9.0 feet, said panel being comprised of a metallic material;
   a plurality of lateral supports being mounted on said top side and extending from said first lateral edge to said second lateral edges, said lateral supports being spaced from each other and being oriented parallel to each other, said plurality of lateral supports including at least three lateral supports and no more than ten lateral supports;
   a plurality of longitudinal supports being mounted on said bottom side and extending from said front edge to said rear edge, said longitudinal supports being spaced from each other and being oriented parallel to each other, said longitudinal supports including at least two longitudinal supports and no more than five longitudinal supports;
   a plurality of fasteners extending through said panel, each of said fasteners engaging one of said lateral supports and one of said longitudinal supports such that each of said lateral supports is coupled to at least two of said longitudinal supports;
   a barrier coating being positioned on and covering entirely said top side, said barrier coating comprising an elastomeric coating; and
   a lateral barrier being attached to said first lateral edge and extending upwardly therefrom, said lateral barrier being coextensive with said first lateral edge, said lateral barrier being angled away from said panel such that an obtuse angle is formed with said lateral battier and said top side; and
   wherein said panel is configured to be placed upon one or more load cells to measure a weight of an animal standing on said panel.

\* \* \* \* \*